US008512137B2

(12) United States Patent
Hayes et al.

(10) Patent No.: US 8,512,137 B2
(45) Date of Patent: Aug. 20, 2013

(54) CONTROLLING ELECTRONIC PLAYING CARDS IN WAGERING ENVIRONMENTS

(75) Inventors: Sean E. Hayes, Arlington Heights, IL (US); Timothy C. Loose, Chicago, IL (US); Scott A. Massing, Lincolnwood, IL (US); James E. Motyl, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 372 days.

(21) Appl. No.: 12/860,477

(22) Filed: Aug. 20, 2010

(65) Prior Publication Data

US 2011/0045886 A1 Feb. 24, 2011

Related U.S. Application Data

(60) Provisional application No. 61/235,929, filed on Aug. 21, 2009.

(51) Int. Cl.
*A63F 13/00* (2006.01)

(52) U.S. Cl.
USPC .................. 463/31; 463/20; 463/33; 463/34; 463/43

(58) Field of Classification Search
USPC .................. 463/16, 20, 29, 31, 34, 40, 43, 33
See application file for complete search history.

(56) References Cited

U.S. PATENT DOCUMENTS 4,455,025 A 6/1984 Itkis
4,624,462 A 11/1986 Itkis
5,240,249 A 8/1993 Czarnecki et al.
6,165,069 A 12/2000 Sines et al.
6,651,985 B2 11/2003 Sines et al.
6,722,974 B2 4/2004 Sines et al.
6,991,540 B2 * 1/2006 Marlow .......................... 463/16

(Continued)

FOREIGN PATENT DOCUMENTS

WO WO-9946019 9/1999
WO WO-2005043475 5/2005
WO WO-2006031440 3/2006
WO WO-2010056929 5/2010

OTHER PUBLICATIONS

"Arizona State University: Flexible Display Center", http://flexdisplay.asu.edu/ (Date Obtained: Apr. 8, 2009) No Publication Date Found , 1 page.

(Continued)

*Primary Examiner* — James S McClellan
(74) *Attorney, Agent, or Firm* — DeLizio Gilliam, PLLC

(57) ABSTRACT

A wagering game system and its operations are described herein. In embodiments, the operations can determine a wagering game in progress for a wagering game session, and determine an electronic playing card that is in use for the wagering game that uses playing cards. The operations can also determine primary content related to the wagering game, and electronically present the primary content on the electronic playing card for use in the wagering game. The primary content can include playing elements (e.g., card ranks and card suits) for the wagering game. The operations can also determine secondary content to be presented on the electronic playing card, and electronically present the secondary content on the electronic playing card during the wagering game session. The secondary content can include wagering games that are different from the primary content (e.g., secondary wagering games that use playing elements other than cards, such as slot games).

24 Claims, 9 Drawing Sheets

(56) References Cited

U.S. PATENT DOCUMENTS

| | | | | |
|---|---|---|---|---|
| 7,255,642 | B2 | 8/2007 | Sines et al. | |
| 2006/0063587 | A1 * | 3/2006 | Manzo | 463/25 |
| 2008/0214271 | A1 | 9/2008 | Rydberg | |
| 2008/0234024 | A1 | 9/2008 | Connors et al. | |
| 2010/0261519 | A1 * | 10/2010 | Zapata et al. | 463/22 |

OTHER PUBLICATIONS

"E-Ink Electronic Paper Displays", www.eink.com (Date Obtained: Apr. 8, 2009) No Publication Date Found , 1 page.

* cited by examiner

CONTROLLING ELECTRONIC PLAYING CARDS IN WAGERING ENVIRONMENTS

RELATED APPLICATIONS

This application claims the priority benefit of U.S. Provisional Application Ser. No. 61/235,929 filed Aug. 21, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control electronic playing cards in wagering game environments.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
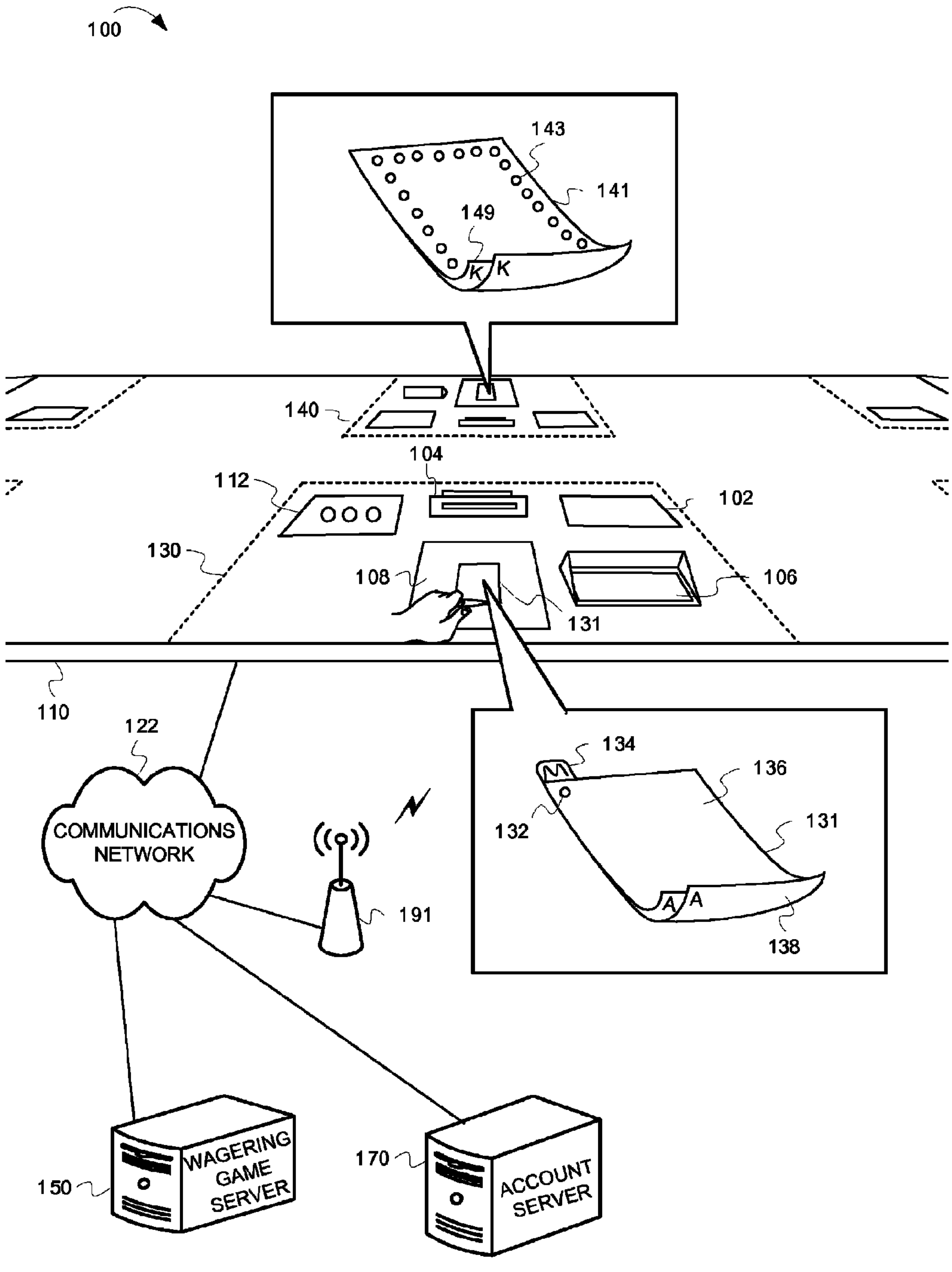
FIG. 1 is an illustration of incorporating electronic playing cards into an electronic casino environment, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Casinos use traditional playing cards in a variety of gambling games. The traditional deck of playing cards includes cards, each with a unique combination or unique configuration of images on a front side, or face ("front images"). The front images can indicate ranks and suits. The suits usually include four distinct symbols (e.g., clubs, diamonds, spades and hearts). Each suit can include a variety of ranks (e.g., Ace, Two, Three, Four, Five, Six, Seven, Eight, Nine, Ten, Jack, Queen and King). A deck of traditional playing cards usually includes 52 cards (not including Jokers). Players can hold traditional cards in their hands or lay them flat on a playing surface during a playing round. The backs of the cards have a printed, undistinguishable image so that player opponents cannot distinguish the front image of cards in another player's hands. Usually traditional playing cards are constructed from some form of paper, or light material, and coated with a smooth material, such as plastic. A plastic coating, for example, ensures that the cards slide easily over each other, facilitating dealing. With use, however, the smooth coating wears away and the paper frays. Sometimes paper cards become bent or marked, becoming identifiable by opponents. Casinos usually discard an entire deck when cards become old or identifiable. Thus, traditional playing cards have some drawbacks. The drawbacks have led some gaming manufacturers to create card games that present playing card images on display monitors instead of using traditional playing cards. However, a display monitor removes the actual playing card as an element from the game. A good card-game player sometimes can tell an opponent's emotions by how their opponent manipulates (e.g., holds, shifts, etc.) their actual playing cards during a round of play. Thus, removing the actual cards from the game removes an interesting element that some players miss.

Some embodiments of the present subject matter, however, present electronic playing cards that can maintain the look and feel of traditional playing cards. Embodiments can present primary content (e.g., card ranks and suits for a card game) on the electronic playing cards. Further, other embodiments modify or manipulate images on the front and back of the electronic playing cards to present secondary content, such as content that is separate, or different, from the primary content. (e.g., secondary games that players can play during the card game, suggestions or notifications that assist players to play the card game, social network messages, casino service messages, advertisements, financial transactions, player account information, customized card imagery, etc.). Some embodiments can monitor orientations of electronic playing card surfaces and provide, or modify, content according to the orientations (e.g., prevent inadvertent displays of card values during the card game). Other embodiments interact with player accounts to determine customized content to present on electronic playing cards, customize the presentation of content on electronic playing cards, control wagering for secondary content on electronic playing cards, etc.

Some embodiments of the present subject matter include examples of controlling electronic playing cards in casino wagering game environments. However, other wagering venues can also control electronic playing cards (e.g., an online casino, a wagering game website, etc.). Embodiments can be presented over any type of communications network (e.g., public or private) that provides access to wagering games, such as a website (e.g., via wide-area-networks, or WANs), a private gaming network (e.g., local-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.). In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling".

FIG. 1 is a conceptual diagram that illustrates an example of incorporating electronic playing cards into an electronic casino environment, according to some embodiments. In FIG. 1, a wagering game system ("system") 100 includes an electronic-playing-card table ("table") 110 with a multitude of player playing stations ("stations") 130, 140. The table 110 and the stations 130, 140 can be interconnected. At the stations 130, 140, players can interact with a number of electronic playing cards or "e-cards" (e.g., e-cards 131 and 141). Each station can include electronic playing card implements and devices utilized during a card game. For example, station 130 includes a chip section 112 for storing betting chips. The station 130 can also include a deal/discard section 102 for receiving and discarding e-cards. The e-cards 131 and 141 can also be put into a discard state, or many other game related states, via a player action such as pressing a button on the table 110, or a button on the e-cards 131 and 141. The station 130 can also include a display 160 for presenting information related to the card game, the player account, etc. Further, the station 130 can include a card playing area 108 for interacting with the e-cards 131. The card playing area 108 can be transparent (or semi-transparent) and a card position tracking device (e.g., a camera, a laser, etc.) within the table 110 can track movements and orientation of the e-cards 131. The card playing area 108 can provide access to projector type devices to emit images onto the e-cards 131 in conjunction with the card position tracking device. The station 130 can also include a card control device 104 that can write and erase data on the e-cards 131.

The table 110 and the e-cards 131, 141 can be connected to an account server 170 that can facilitate transactions that occur for, and track data related to, a player account. The table 110 and the e-cards 131, 141 can be connected via a communications network 122, which can include wired and wireless capabilities. Also connected to the communications network 122 are casino content sources, such as a wagering game server 150 which, in some embodiments, can provide wagering game content that can be presented on the front or back of the e-cards 131, 141 during a wagering game session. Also connected to the communications network 122, though not shown, can be a marketing server, an advertising server, a player tracking server, a player services server, a web server, a player inter-communication server, and any other server, or device, that can interact with the e-cards 131, 141 and can provide content presentable on, or in conjunction with, the e-cards 131, 141. In some embodiments, the system 100 can present content on the e-cards 131, 141 during a playing round (e.g., between bets for a playing round) or outside of a playing round (e.g., between hands). In some embodiments, players can carry the e-cards 131, 141 with them away from the table 110. For example, the e-cards 131, 141 can have a dual-function as a player tracking card and an electronic playing card. Thus, the system 100 can also present content on the e-cards 131, 141 while away from the table 110. The e-cards 131, 141 are, in some embodiments, transportable so that players can carry the e-cards 131, 141 to different playing tables that provide different card games. The e-cards 131, 141 can also include security features so that players can carry the e-cards 131, 141 with them outside of a casino. The e-cards 131, 141 can be made of flexible electronic paper, or e-paper, which allows the e-cards 131,141 to bend like traditional paper cards. In some embodiments, the e-paper can include an electronic ink display, which reflects light like ordinary paper and ink and is capable of holding text and images indefinitely without drawing electricity, while allowing the image to be changed later. In some embodiments, the e-paper can also utilize electrofluidics. The card control device 104 can include, or be associated with, an electronic ink writing mechanism, such as the e-paper device 404 described in FIG. 4 further below. Some embodiments can include color filters to generate color images with electronic ink. In some embodiments, the e-cards 131, 141 can use flexible, paper-thin, organic light-emitting diodes (OLEDS). Further, other embodiments may use other electronic display technologies that look and feel like traditional playing cards. In some embodiments, the e-cards 131, 141 can have identification units built into them, with unique identification data, so that the system 100 can identify specific cards and track their values, locations, orientations, etc. The e-cards 131, 141 can have different configurations from each other. For example, e-cards 131 have one configuration including a front 138, a back 136, and a rivet 132 holding two individual card units together. The e-cards 131 can include a wireless receiver 134, which can communicate with a wireless transmitter 191. E-cards 141 can have a different configuration than the e-cards 131. For instance, the e-cards 141 may be a single card unit with a fanned corner 149 that extends to present a second card value. The e-cards 141 can also include light devices 143 that can blink, or present other light patterns, colors, etc. In some embodiments, the e-cards 131, 141 can be other configurations, including varying geometric shapes (e.g., squares, circles, etc.), varying thicknesses, varying number of individual card units, varying appendages, and so forth. For example, in some embodiments, the e-cards 131 or 141 can be multiple cards that can be fanned by a user and/or rearranged in order of the player's perceived value. Each of the multiple cards can have the light devices that can represent individual card events, or game play events. In some embodiments, card appendages can differentiate the e-cards 131, 141 from traditional playing cards.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
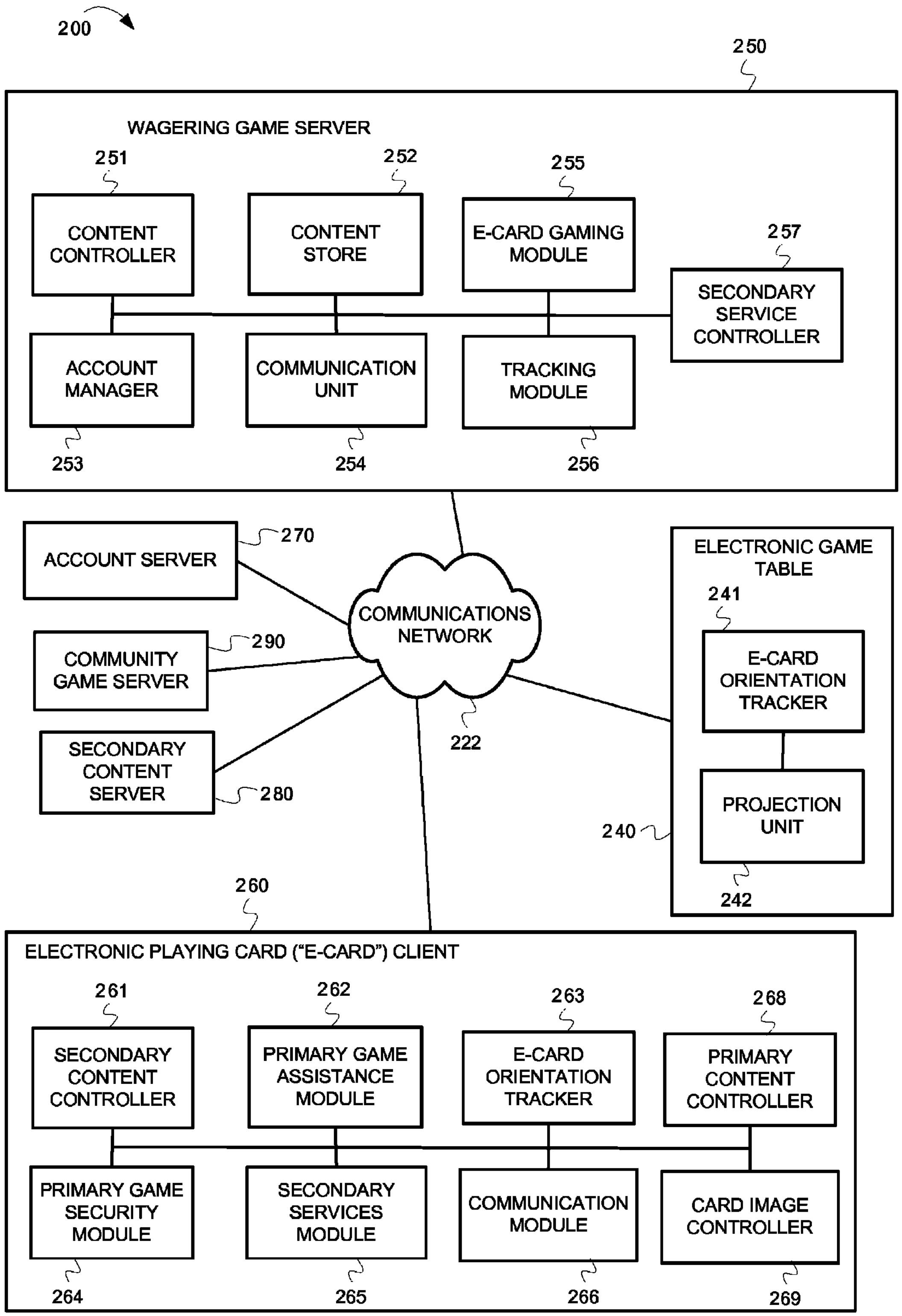
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store wagering game player account information, such as account settings (e.g., settings related to group games, etc., settings related to social contacts, etc.), preferences (e.g., player preferences regarding primary game assistance on e-cards, player preferences regarding secondary content presentation on e-cards, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from an electronic playing card client ("e-card client") 260. The wagering game server 250 can include a content controller 251 configured to manage and control content for the presentation of content on e-card devices associated or integrated with the e-card client 260. For example, the content controller 251 can generate game results (e.g., win/loss values), including win amounts, for games played via the e-card client 260. The content controller 251 can communicate the game results to the e-card client 260. The content controller 251 can also generate random numbers and provide them to the e-card client 260 so that the e-card client 260 can generate game results. The wagering game server 250 can also include a content store 252 configured to contain content to present on e-card devices associated or integrated with the e-card client 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the e-card client 260 and to communicate with other systems, devices and networks. The wagering game server 250 can also include an e-card gaming module 255 configured to control gaming content for wagering games that use electronic playing cards and interact with the e-card client 260. The wagering game server 250 can also include a tracking module 256 configured to track a position, in a casino, of electronic playing card devices associated, or integrated with the e-card client 260. The tracking module 256 can also provide services related to a player account associated with e-cards and/or the e-card client 260. The wagering game server 250 can also include an e-card secondary service controller 257 configured to respond to requests by the e-card client 260 for secondary services. The e-card secondary service controller 257 can provide secondary services and secondary content (e.g., web services, advertising, personal communications, etc.) to present on e-card devices associated, or integrated with the e-card client 260.

The wagering game system architecture 200 can also include an e-card client 260 configured to present primary content and secondary content on e-card devices associated, or integrated, with the e-card client 260. The e-card client 260 can be incorporated with an electronic playing card or be used in conjunction with electronic playing cards, such as to write data to, and read data from, electronic playing cards. The e-card client 260 can include a primary content controller 268 configured to control and present content for a card game (e.g., Poker, Blackjack, etc.). A card image controller 269 can present images that correlate with the content for the card game and for other, or secondary, content. The e-card client 260 can also include a secondary content controller 261 configured to present secondary content, including secondary wagering games that players can play on electronic playing cards, such as during a wagering session for a primary card game. The e-card client 260 can also include a primary game assistance module 262 configured to facilitate play of a primary card game associated with the e-card client 260. For example, the primary game assistance module 262 can provide indicators that improve a rate of play for a primary game (e.g., provide reminders about turns by flashing lights on the back of e-cards, provide indicators of bet amounts on the front of e-cards, etc.). The primary game assistance module 262 can also offer suggestions for playing a primary game, provide help files for game rules related to the primary game, etc. The e-card client 260 can also include an e-card orientation tracker 263 configured to determine orientations of e-cards in relation to reference points associated with electronic playing cards and/or player stations on an electronic game table 240. The e-card client 260 can also include a primary game security module 264 configured to prevent inadvertent displays of e-card front images during a primary game round. The primary game security module 264 can receive data from the e-card orientation tracker 263 and modify images presented on e-cards based on the orientation of the e-cards. The e-card client 260 can also include a secondary services module 265 configured to offer and present communication services on e-cards, transact purchases using e-cards, present advertising on e-cards, etc. The e-card client 260 can also include a communication module 266 configured to communicate with devices on, integrated with, or associated with, an electronic playing card table (e.g., player station devices, e-card tracking devices, image projection devices, card control panels, e-card shufflers, e-card ports, etc.).

The wagering game system architecture 200 can also include a community game server 290 configured to provide and control content for community games, including networked games, social games, competitive games, or any other game that multiple players can participate in at the same time.

The wagering game system architecture 200 can also include a secondary content server 280 configured to provide content and control information for secondary games, or other secondary content, available on a wagering game network (e.g., secondary wagering game content, promotions content, advertising content, player tracking content, web content, etc.). The secondary content server 280 can provide "secondary" content on e-card devices associated, or integrated, with the e-card client 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

The wagering game system architecture 200 can also include the electronic game table 240 configured to interface and interact with the e-card client 260 during a card game session. The electronic game table 240 can include an e-card orientation tracker 241 configured to determine an orientation of an e-card device integrated or associated with the e-card client 260. For example, the e-card orientation tracker 241 can determine an orientation of a surface of e-cards in relation to player stations on the electronic game table. The electronic game table 240 can also include a projection unit 242 configured to project images onto surfaces of e-card devices associated or integrated with the e-card client 260. In some embodiments, the electronic game table 240 can include transmissive power devices to power e-cards when the e-cards are placed on a certain section of the electronic game table 240. Additionally, the electronic game table 240 can animate, or simulate, the appearance of a dealer that deals out e-cards. The electronic game table 240 can also include buttons to burn e-cards, and can present images of discarded cards (e.g., the electronic game table 240 can animate cards that have been discarded into a cast-off pile). In some embodiments, the electronic-playing-card tables 110, 510, and 710 are examples of the electronic game table 240.

Each component shown in the wagering game system architecture 200 is shown as a separate and distinct element connected via a communications network 222. However, some functions performed by one component could be performed by other components. For example, the wagering game server 250 can also be configured to perform functions of the primary game assistance module 262, the primary game security module 264, the secondary services module 265, e-card orientation trackers 241, 263, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the e-card client 260 instead of, or in addition to, being a part of the wagering game server 250. Further, in some embodiments, the e-card client 260 can determine wagering game outcomes, generate random numbers, etc. instead of, or in addition to, the wagering game server 250.

In some embodiments, the e-card client 260 can take the form of, or be incorporated with, a wagering game machine. For example, an electronic playing card can interface with (e.g., be swiped on, be inserted into, communicate wirelessly with, etc.) a wagering game machine instead of, or in conjunction with, an electronic game table. For example, a player playing station at an electronic card table can have a docking port for a mobile wagering game machine. The mobile wagering game machine can have an electronic playing card port for connecting with an electronic playing card. The mobile wagering game machine can also include e-card devices including, but not limited to, the e-card client 260. The mobile wagering game machine can also include gaming functionality similar to that of the wagering game server 250 and, thus, can work in conjunction with, or take the place of the, the wagering game server 250. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein. Machine-readable storage media includes any mechanism that stores information in a form readable by a machine (e.g., a wagering game machine, computer, etc.). For example, tangible machine-readable storage media includes read only memory (ROM), random access memory (RAM), magnetic disk storage media, optical storage media, flash memory machines, etc. Some embodiments of the invention can include machine-readable signal media, such as any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
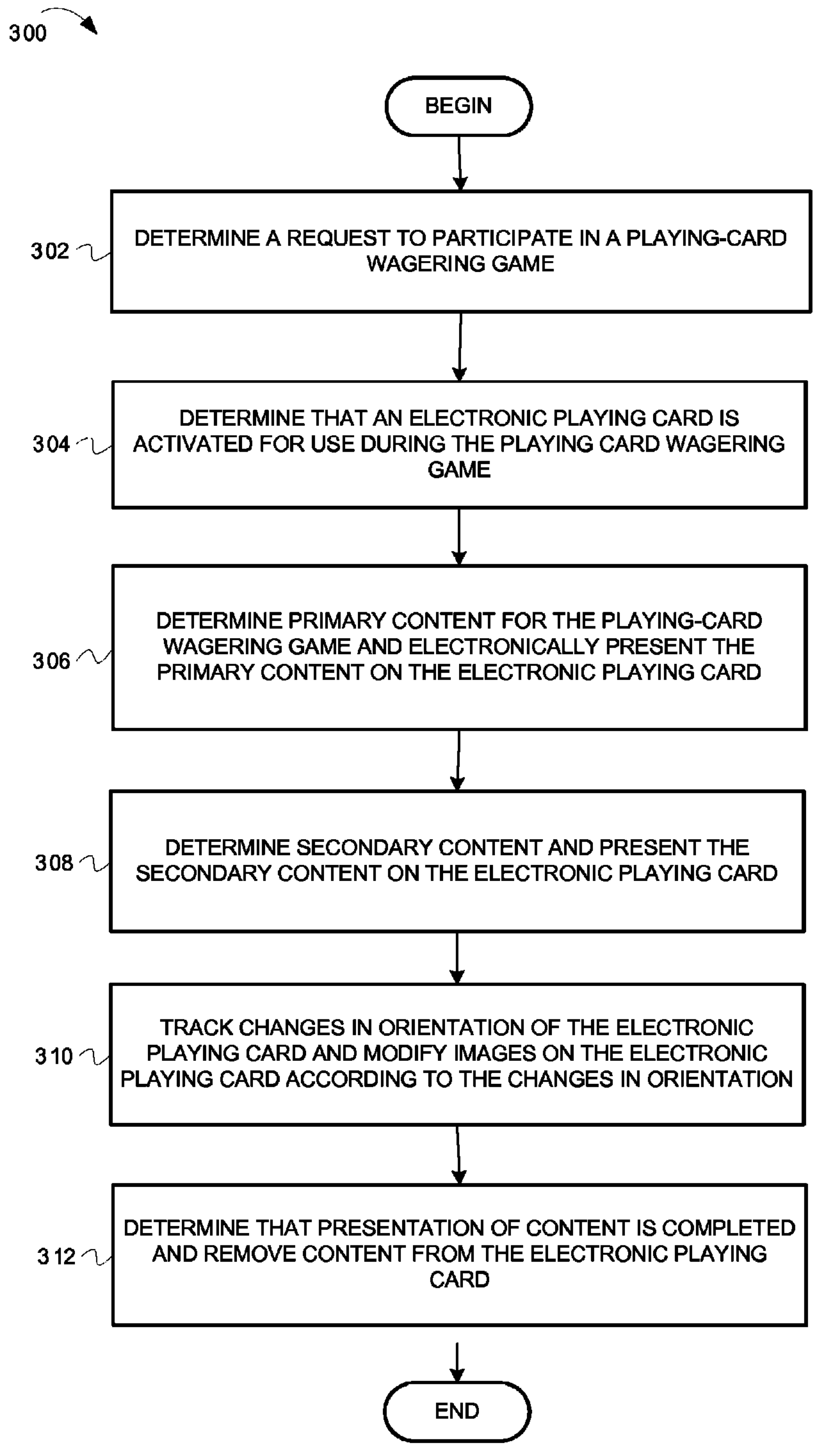
FIG. 3 is a flow diagram 300 illustrating controlling electronic playing cards in wagering games, according to some embodiments.
Figure 4:
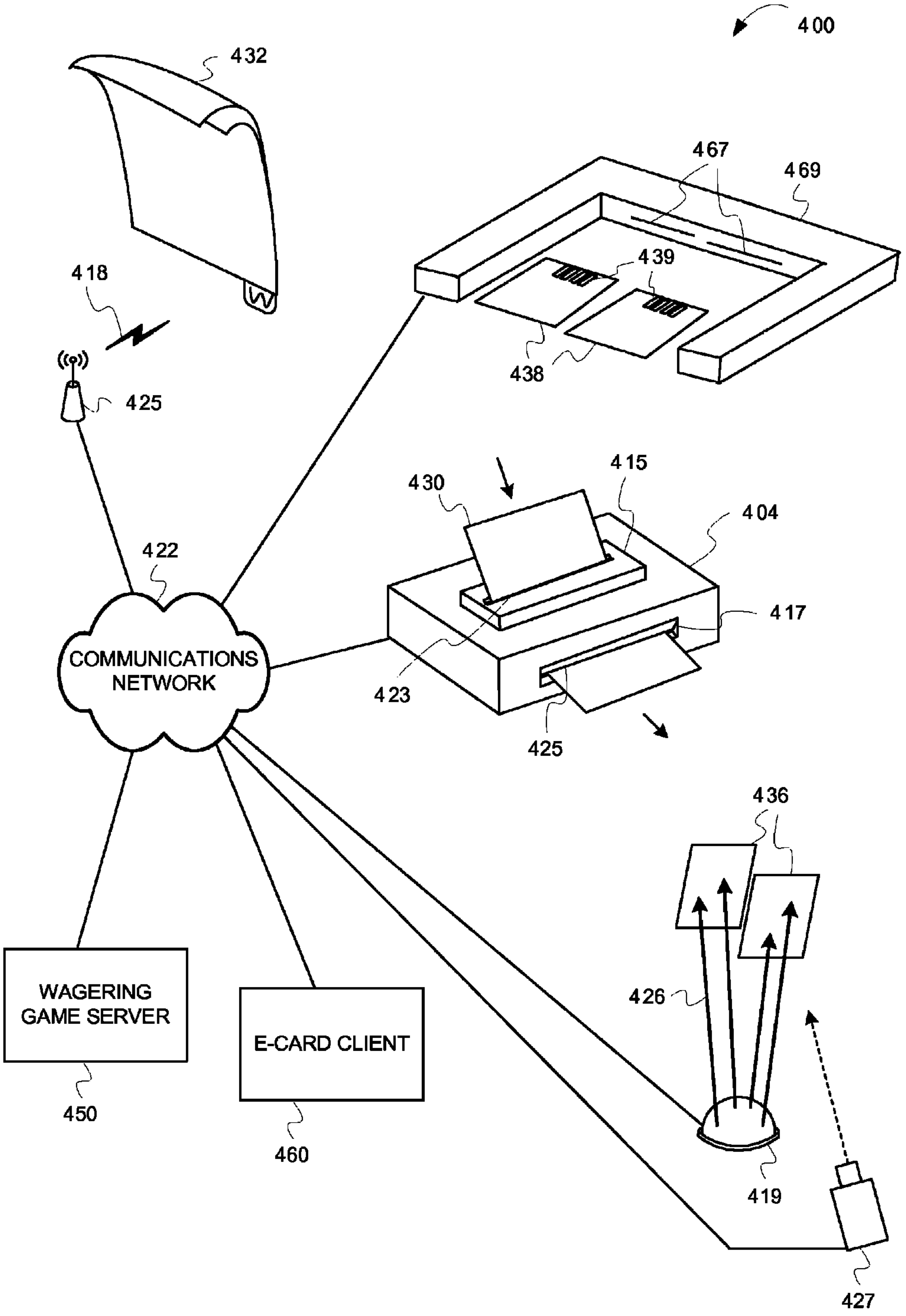
FIG. 4 is an illustration of communicating with, and controlling, electronic playing cards, according to some embodiments.

FIG. 3 is a flow diagram ("flow") 300 illustrating controlling e-cards in wagering games, according to some embodiments. FIGS. 1, 4, 5, 6A, 6B and 7 are conceptual diagrams that help illustrate the flow of FIG. 3, according to some embodiments. This description will present FIG. 3 in concert with FIGS. 1, 4, 5, 6A, 6B and 7. In FIG. 3, the flow 300 begins at processing block 302, where a wagering game system ("system") determines a request to participate in a playing-card wagering game. For example, the system can log on a wagering game player to a player station at a card playing table ("card table") and request to play a playing round, or hand, of the card game for that table (e.g., poker, black-jack, etc.). In some embodiments, the player account can be logged on through a logon interface at the player station. The player account can be associated with a player, or patron, in a casino. The player account can join a card game at an electronic playing card table such as the one depicted in FIG. 1. In FIG. 1, the player logs onto his player account using one of the player stations 130 or 140. For example, the player can connect to the table 110 by inserting e-cards 131, into the card control device 104. In some embodiments, the e-cards 131 can connect wirelessly, using the wireless receiver 134. FIG. 4 illustrates several examples of e-cards and e-card devices. In FIG. 4, a wagering game system ("system") 400 can include a wagering game server 450 and an e-card client 460 connected to a communications network 422. The system 400 can also include a wireless transmitter 425, also connected to the communications network 422, which can send secure wireless signals 418 to wireless receiving e-cards ("wireless e-cards") 432. The wireless e-cards 432 can include a wireless receiver 434 that receives the wireless signals 418 and generates control data (e.g., commands) that can control images on the wireless e-cards 432.

In some embodiments, the system 400 can also include an electrical-contact e-card device 469, which can also be connected to the communications network 422. The electrical-contact e-card device 469 can accept electrical e-cards 438 into connectors 467 (e.g., slots, sockets, etc.). The electrical e-cards 438 can have conductive pins 439 that make electrical contact with the connectors 467.

In another embodiment, the system 400 can also include an e-paper device 404, which connects to the communications network 422. The e-paper device 404 can accept an e-paper e-card 430. The e-paper device 404 can include a first port 415 that can receive the e-paper e-card 430 into a first opening 423. The e-paper device 404 can feed the e-paper e-card 430 through to a second port 417 through a second opening 425. In other embodiments, however, the e-paper device 404 can receive and feed the e-paper e-card 430 in other ways, such as from the front, back or bottom of the e-paper device 404 instead of from the top. As the e-paper e-card 430 feeds through the e-paper device 404, the e-paper device 404 can write electronic ink images onto the e-paper e-card 430 using electronic fields. For example, the e-paper device 404 and the e-paper e-card 430 can employ a flexible electronic paper display (EPD). The EPD has physical balls that move, via electronic charge, to a location on the EPD and stay there until moved again with an electronic charge. The e-paper device 404 can apply the electric field to both sides of the e-paper e-card 430 and write front images on the front side of the e-paper e-card 430 and back images on the backside of the e-paper e-card 430. The e-paper device 404 can write non-distinct images on the back of the card (e.g., undistinguishable images for security purposes), or other content on the backs of the cards such as secondary content (e.g., advertisements, personalized logos, etc.).

In other embodiments, the system 400 can include a projector 419, which can also be connected to the communications network 422. The projector 419 can project images 426 onto projection-type e-cards 436. The projector 419 can project the images 426 onto the fronts or backs of the projection-type e-cards 436. The projector 419 can be included on, or inside, a card-playing surface. The projector 419 can project through a transparent surface of an electronic-playing-card table to an object in space above the table (e.g., onto the projection-type e-cards 436).

In some embodiments, the e-card client 460 can utilize a video camera 427 to track a symbol, edges, or other features included on, or that are a part of, the projection type e-cards 436. In some embodiments, the e-card client 460 can also track features using other devices, such as a laser tracker, a global positioning transmitter, etc. The projector 419 can determine the orientation of the projection type e-cards 436 and project only when projection type e-cards 436 are oriented in a certain way (e.g., facing the player). In some embodiments, the player could turn off the projection and turn it back on again (e.g., via a button on the player station, via a foot peddle or switch at the player's feet, etc.).

The flow 300 continues at processing block 304, where the system determines that an electronic playing card ("e-card") is activated for use during the playing-card wagering game. The system includes card control devices associated with player stations on an electronic-playing-card table, or "e-table." The card control devices can be configured to modify imagery on e-cards. In some embodiments, each player station can include card control devices that determine whether an e-card is activated for use. For example, in FIG. 1, the player station 130 includes the card control device 104 that can write data to the e-cards 131. (e.g., a player can insert their e-cards 131 into the card control device 104 at the player station 130). Returning to FIG. 3, in some embodiments, the system can include a dealer station that can include card control devices. For instance, the dealer station may include the only card control devices for an entire e-table (e.g., a dealer has access to a card control device from which the dealer deals e-cards). In some embodiments, the system can associate a player account with a player's card control device for the wagering game. For example, when a player inserts e-cards into a card control device, the card control device can read an identification chip on the e-card that identifies the player account to which the e-cards belong. In embodiments where the dealer is dealing the cards to players, the dealer can deal the e-cards to a specific "dealt" section of a player station on an electronic playing card table. The electronic playing card table can then associate the dealt card with a player account logged in, or otherwise associated with, a player station. In some embodiments, the dealer station can include an electronic playing card shoe that tracks the direction and location of dealt cards, towards specific player stations, and determines player accounts associated with the specific player stations. In some embodiments, e-cards can be connected to a table (e.g., via a wire) and/or can remain with the table. In other embodiments, however, the e-cards can function as a player's player tracking card, which the player carries and uses for player account purposes.

The flow 300 continues at processing block 306, where the system determines primary content for the playing-card wagering game and electronically presents the primary content on the electronic playing card. For example, the system can determine a card value for the electronic playing card for a hand of poker. The system can determine eligible card values (e.g., combinations and/or configurations of ranks and suits) that have not been used, or played, yet for a deck cycle of one or more electronic playing card decks. A deck cycle may also be referred to as a shuffle cycle where card values have been randomized and remain in their current randomized state until shuffled again. The system selects from an eligible card value that has not yet been played for a deck cycle. The system can then provide the card value to a device that will write a front image onto an e-card. The front image represents the card value which, in some cases, includes the rank (e.g., Ace, King, Queen, Jack, Ten, Nine, Eight, Seven, Six, Five, Four, Three, Two) and suit (e.g., hearts, spades, diamonds, clubs). The system tracks the card value used and tags it as being ineligible for further use until the deck cycle is refreshed (i.e., until the card values of the deck are reshuffled or re-randomized again). The system can reshuffle the deck by storing the randomized order for card values on a wagering game server and providing the card values to e-card writing devices in an order of request. In some embodiments, the system can associate the card value with a player account to track a player account outcome for the card game. For example, in embodiments where a dealer deals e-cards, the system can track the locations of player stations and determine which player accounts are associated with the player stations. The system can use monitoring devices to determine a front image that is on a dealt e-card and/or determine the direction to which player station the card was dealt or where the dealt card falls on the table (e.g., in a "dealt card" section of a player station). In embodiments where every player station has its own card control device, the player station card control devices can communicate with a wagering game server to receive card values and, subsequently, electronically write the front image onto the e-card. The card control devices can determine the player accounts at the player stations and associate the card values with the player accounts. The system can thus track card values for all player stations. The system can also track game outcomes that result in awards and automatically transact funds to a wagering game player account based on a winning outcome of a card round for the wagering game player account on the e-cards. The system can also track wager amounts and transact bets or wagers from the wagering game player account during a round of game play.

As an example, in FIG. 4, the e-card client 460 can be associated with the wagering game server 450, which can control game elements including what card values are dealt to e-cards at specific player stations. The e-card client 460 can determine an associated front image (e.g., rank image and suit image combination) that is associated with a card value (e.g., determine a specific "A" image and "heart" image that accompany the card value having the "Ace" as a rank and the "heart" as a suit value). The e-card client 460 can communicate the front image to a card control device (e.g., the e-paper device 404, the electrical-contact e-card device 469, the wireless receiver 434, or the projector 419). The card control device can then electronically write, inscribe, display, or otherwise present, the front image onto the front of an associated e-card (e.g., e-paper e-card 430, electrical e-cards 438, wireless e-cards 432, and projection type e-cards 436).

In some embodiments, the system can present e-card imagery based on various factors such as, but not limited to, one or more of the following:

Game related events. In some embodiments, for example, the system changes e-card colors to indicate that betting limits have changed for an e-card game, the system causes images on the player's e-cards to sneer when a dealer hits a Blackjack, the system flashes the back of the e-cards when a deal occurs to indicate that the e-cards are being dealt, the system flashes lights on an e-card to indicate that it is a player's turn to perform, the system presents flashes on an e-card when a player wins, the system presents flashes on an e-card to indicate a bad beat, the system presents on e-cards betting amounts that players have made, etc.

Game types. In some embodiments, for example, for a Texas Hold 'Em game, the system presents Texas imagery as backgrounds on e-cards, for a Blackjack game the system presents the number "21" on the borders of e-cards, etc.

A room or event theme. In some embodiments, for example, for a battle themed room the system presents battle images on e-cards, for a very-important-person, or VIP, room the system presents VIP images on e-cards, for a sci-fi themed room the system presents sci-fi images on the e-cards, etc.

A host or sponsor. In some embodiments, for example, the system presents branding imagery of a casino, an event, a company, a room sponsor, a room host, etc.

A player's performance in an e-card game. In some embodiments, for example, the system presents imagery, coloring, identifiers, etc. of a chip stack leader, a highest better, etc.; a player receives a royal flush and so for the next few hands the system presents a picture of the player's avatar on each electronic playing e-card; etc.

A player's history or experience at an e-card game. For example the system can review a player accounts history or profile information and determine a player's playing level at a particular card game (e.g., novice, avid, pro). The system can then control an amount of information given to the player' on e-cards (e.g., during a game, during tournaments, etc.) based on the player's playing level. The system can, thus, regulate, or minimize, a player's vulnerability to more experienced players (e.g., card sharks). The system can segregate, or indicate, players based upon their abilities, or playing levels. For example, the system can change an e-card's face color based upon the player's playing level so that other players could know what type of player they are playing against and act (e.g., bet) accordingly.

An e-card character. In some embodiments, for example, the system can animate movement a Queen e-card character to smile, wink, convey a textual message, etc.

Figure 5:
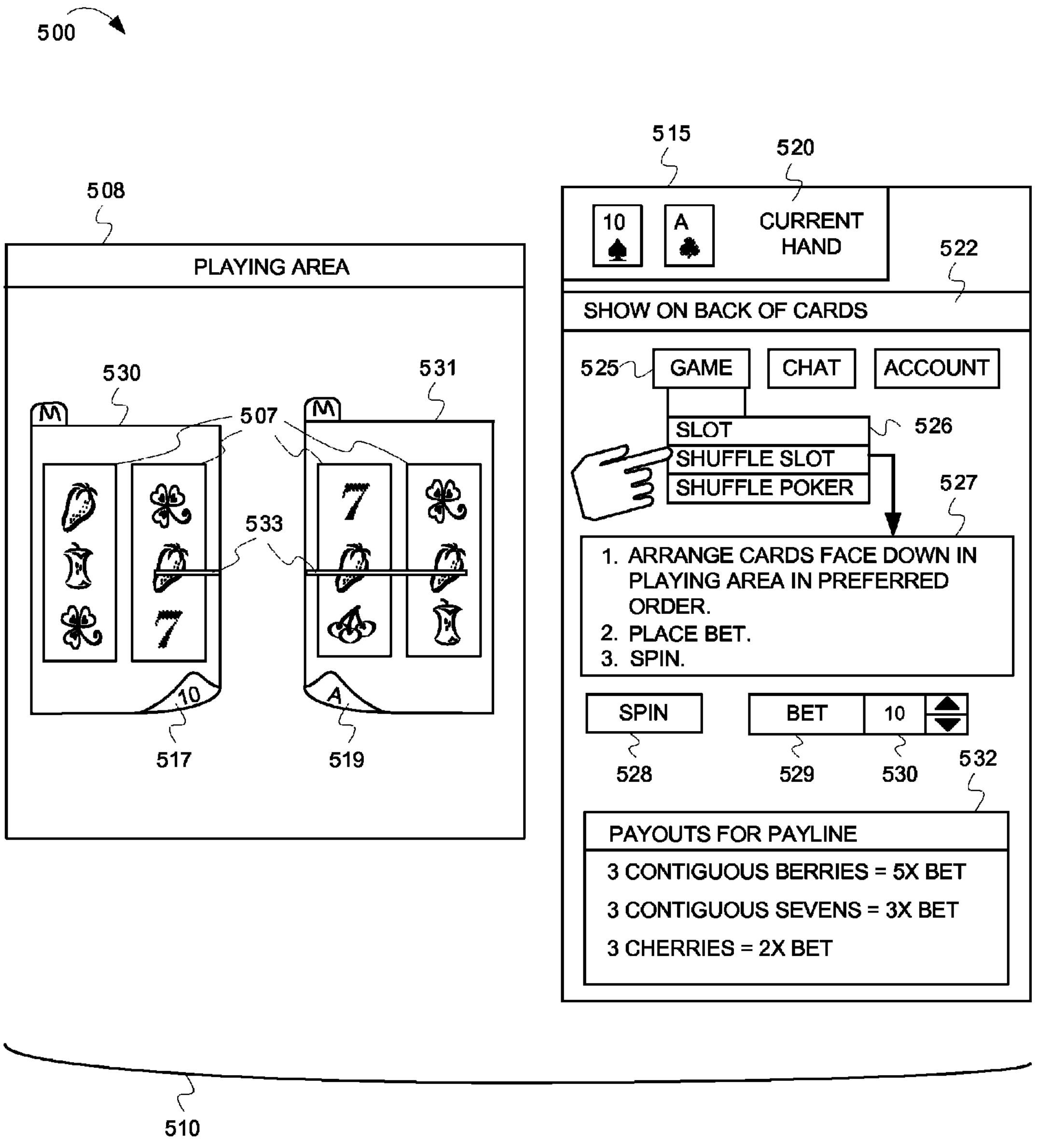
FIG. 5 is an illustration of controlling secondary content on electronic playing cards and associated player station devices, according to some embodiments.
Figure 6A:
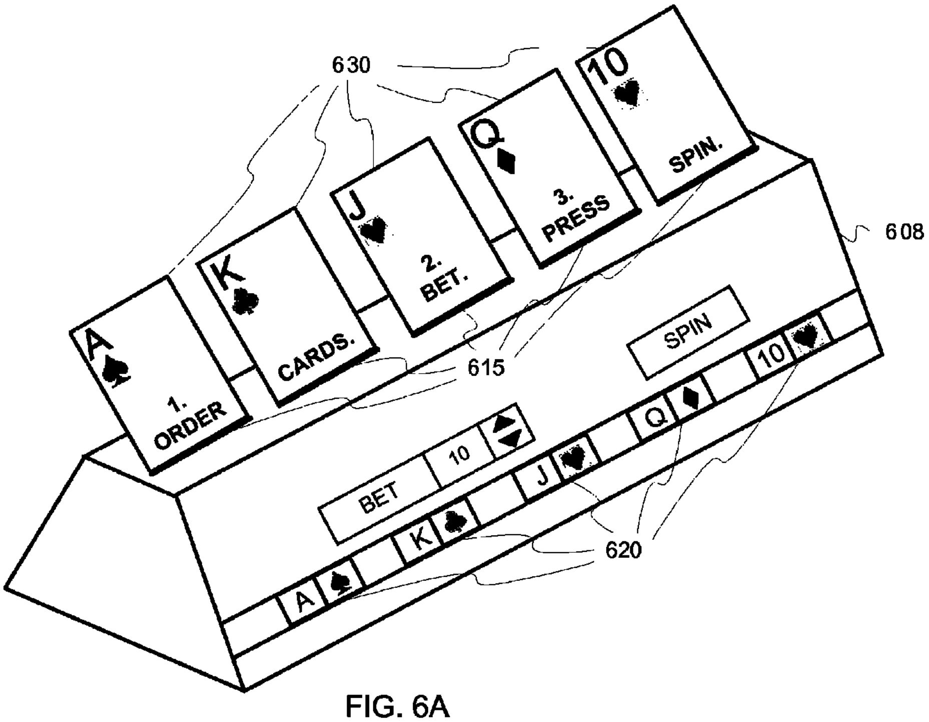
FIGS. 6A and 6B are illustrations of controlling secondary slot games on electronic playing cards, according to some embodiments.
Figure 6B:
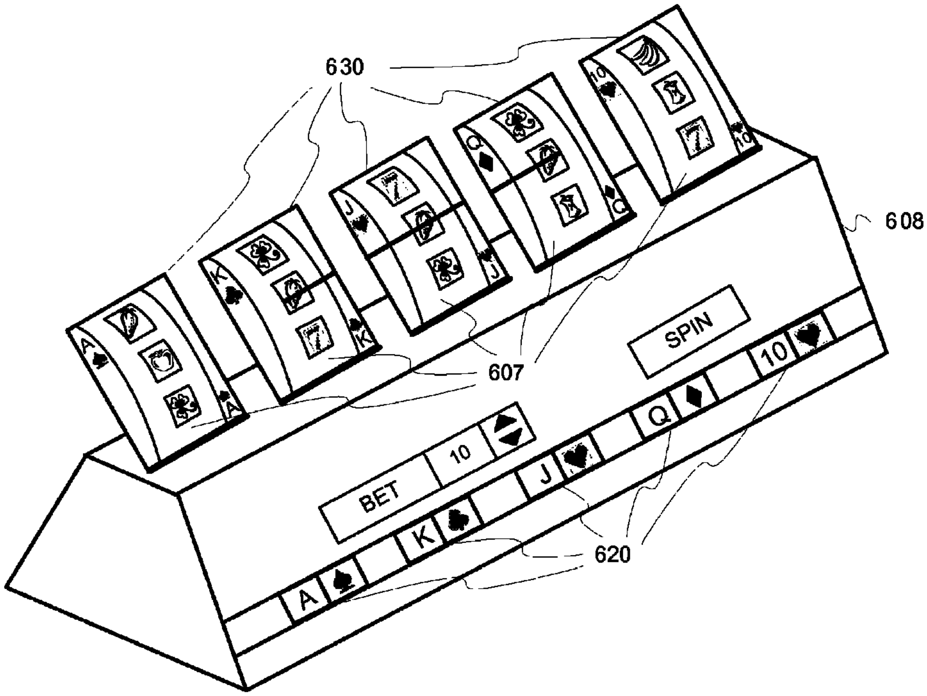

A player request. In some embodiments, for example, the system presents a web browser on an e-card when a player requests to surf the Internet during an e-card game, the system presents a secondary wagering game on an e-card between hands when requested, the system presents wagering game rules on e-cards when requested, the system presents hints and tips for playing the e-card game when requested, etc. FIGS. 5, 6A and 6B below illustrate examples of presenting a slot game on e-cards.

A player account's options, settings, preferences, etc. (e.g., font size, player preferred imagery or themes, player graphics, player identification information, account management information, preferred ads, etc.).

Figure 7:
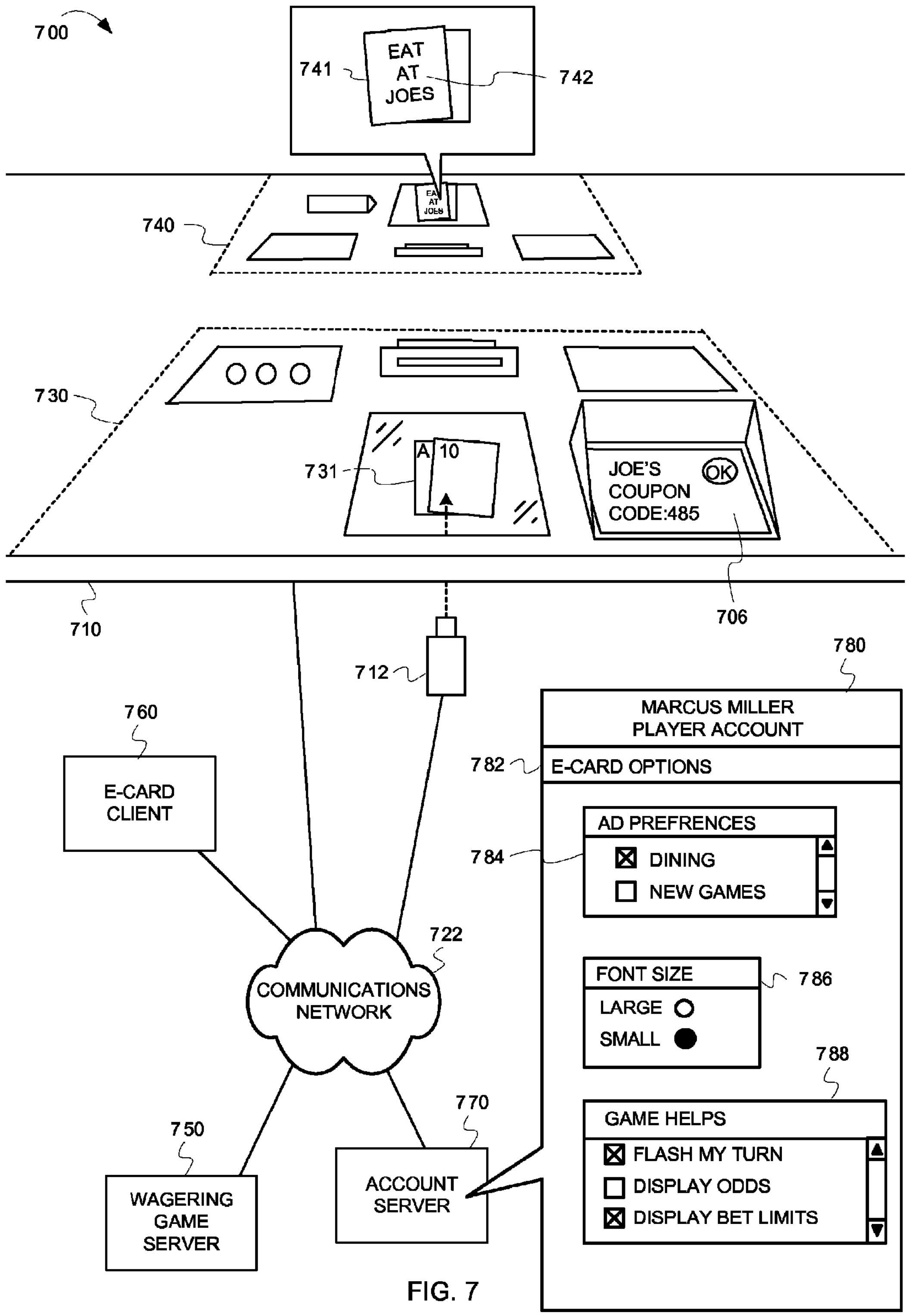
FIG. 7 is an illustration of presenting advertising on electronic playing cards based on player preferences and card orientations, according to some embodiments.

An e-card orientation. In some embodiments, for example, the system obscures images of an e-card's face to protect inadvertent displays of e-card values, the system presents advertisements on the back of e-cards when an opponent is positioned on an opposite player station, etc. FIG. 7, described further below, illustrates an example of presenting advertising information according to a player account's preferences and based on e-card orientation. In some embodiments, e-cards can include a lenticular type security screen to each e-card face so that the viewable angle of an image can be narrowed.

Marketing and analytics. In some embodiments, for example, the system can analyze or refer to a player's game history and generate advertisements and other marketing imagery to present on e-cards.

A player location. In some embodiments, for example, the system can determine a player account identification device that is within a pre-determined distance to an electronic playing card. For example, the player can have a player tracking radio-frequency identification (RFID) chip associated with a player tracking card. The system can detect the RFID chip and determine a player account associated with the player tracking card. When the system has identified the player account, the system can determine customized content for the player account (e.g., via player preferences, via player history, etc.). The system can present the customized content on a side of the electronic playing card that is facing the player account identification device. For example, the system can track the location of players that participate in a large Texas Hold 'Em type tournament and can provide maps on the e-cards to participants to notify the participants of tables they are sitting at and which tables they are to go to next. Further, the system can remotely track players winnings and losses, via an account based wagering, because the e-cards can remotely transmit wins and losses.

Customized games. In some embodiments, the system can present new suits, ranks, additional cards, etc. to already existing e-card decks, or electronically modify suits, ranks, and other existing images for new and/or customized games without having to print custom decks or swap decks.

Audience presentations. The system can facilitate television, online, or other presentation media by ascertaining card values (e.g., determining hole cards that a player has while in a Texas Hold 'Em televised tournament and presenting the card values to an audience.)

A gaming table type. For example, e-cards can be objects recognized by surface-computing type tables. The system can also present card-like images on LCD surface-computing tables.

The flow 300 continues at processing block 308, where the system determines secondary content and presents the secondary content on the electronic playing card. In some embodiments, the system can electronically present the secondary content on the e-card contemporaneously with the primary content, during a wagering game session. In some embodiments, the system can modify presentation of the primary content to accommodate presentation of the secondary content on a front side of the electronic playing card. For instance, the system can determine that a player has folded a hand, or is waiting a turn to bet, and the system can move, minimize, or temporarily remove card values from the front of an e-card to present secondary content. In some embodiments, the system can present a secondary wagering game on the e-card. For example, during a gaming session, a player may encounter a period of non-activity in the primary wagering game (e.g., a player folds or busts before a round of play is completed for all players, a player awaits a turn to bet during the round of play, etc.). During the period of non-activity, the player requests to play a secondary wagering game. The system recognizes the players request and initiates the presentation of a secondary wagering game. If the player requests the secondary wagering game while the player is still active in the primary game, the system can store a current value of the e-cards (e.g. capture the current state of the e-cards) and present the current value on a secondary display or store the card value to recall later. The system can then present secondary game content on the e-cards and conduct a wagering game using the e-cards. For example, the system can present animations of slot reels, or other game play elements, on an e-card. FIG. 5 illustrates an example of presenting a slot reel game on electronic playing cards. In FIG. 5, a wagering game system ("system") 500 includes an electronic-playing-card table ("table") 510 with at least one player station control panel ("control panel") 515. The table 510 can also include a playing area 508 where a player can place e-cards 530 and 531. A front side 517 of e-card 530 can include a card value (e.g., the rank "10") that relates to the primary card game (e.g., Texas Hold 'Em Poker, Black Jack, etc.) played at the table 510. On the front side 519 of the e-card 531 is another card value (e.g., the rank of "Ace"). The card values comprise the player's hand for the primary game. The control panel 515 can include a primary content section 520 that can shows the current hand or other information related to the primary game. The control panel 515 can also include a secondary content section 522 for presentation of secondary content on the e-cards 530, 531. The secondary content can include a secondary wagering game, such as a slot game. The secondary content section 522 can show options for presenting secondary content on the e-cards 530, 531. The options can include buttons that relate to the different types of secondary content, such as games, chat features, account information, etc. (e.g., game button 525). The game button 525, for example, can include a game menu 526 that presents the types of secondary games available to be presented on the e-cards 530, 531. The system 500 can determine the available secondary games based on a number of factors including the number of e-cards 530, 531 in the playing area 508, an amount of game play elements (e.g., slot reels 507) that need to be presented on the e-cards 530, 531, player preferences, player history, primary game rules or restrictions, marketing data, time of day, location in a casino, special offers, comps, or other information. The secondary content section 522 can include an instruction section 527 that explains how to use the e-cards 530, 531 for a secondary game selected from the game menu 526. For example, for a "shuffle slot" game, a player may need to arrange their e-cards 530, 531 in a preferred arrangement, or player-selected configuration, within the playing area 508. Once the player has arranged the e-cards 530, 531 in the playing area 508, the player can place bets on the shuffle slot game using betting controls (e.g., betting button 529 and betting meter 530). The player can then spin the slot reels 507 (e.g., via the spin button 528). The slot reels 507 appear on the back of the e-cards 530, 531. Based on the secondary game selected, such as the shuffle slot game, the arrangement of the cards may matter as slot reel elements line up in specific configurations. For example, according to the payout chart 532 for the shuffle card game, contiguous numbers of playing elements pay out. So, for example, if the e-cards 530, 531 are arranged properly, three strawberries 547 may appear to line up contiguously along a pay line 533. In a reverse configuration, however, (i.e., if the cards 530, 531 were reversed in their position in the playing area 508) the strawberries 547 would not line up contiguously. Thus, the shuffle slot game depends on the arrangement or "shuffle" of the e-cards 530, 531 by the player. The system 500 can determine if a player moves the e-cards 530, 531 in the playing area 508 and force a tilt. In other embodiments, the system 500 may allow a player to reposition the e-cards 530, 531 after a spin completes to get potential payouts. Based on game rules (e.g., whether a player can or cannot reposition cards, whether a player plays a shuffle slot game versus a normal slot game, etc.) the system 500 can present different payouts based on the risks or gamble involved. The system 500 can also modify bet amounts based on activity or events related to the primary game. For example, the system 500 may increase the betting possibilities on the secondary game based on bet amounts for the primary game (e.g., average bets for a player in the primary game, current bet amounts for the betting round in the primary game, bet limits in the primary game, etc.). FIG. 5 shows four reels 507 presented on the e-cards 530, 531 (i.e., two on each e-card 530, 531). In some embodiments, the number of reels, or other playing elements, can be limited to the number of cards used in the primary game. For example, FIGS. 6A and 6B illustrate an example of a primary game that uses five e-cards 630. In FIG. 6A, the e-cards 630 can fit into a base 608 at slots 615. The player can arrange the e-cards 630 in any desired configuration or order. Card values can appear on the e-cards 630 and in displays 620. In FIG. 6B, during the primary game, such as during lulls or breaks in the primary game or when the player does not need to look at the card values of the e-cards 630, the e-cards 630 can present slot reels 607. The face and suit values of the e-cards 630 can remain in the displays 620. The slot reels 607 can number one for each e-card 630 and can be presented on the front of the e-cards 630. The reels 607 can appear to have a three-dimensional (3D) look when presented on the e-cards 630, or could be mechanically curved by a fixture on the e-cards 630 as a substrate of the e-cards 530 can be flexible. The e-cards 630 can also present the card values for the primary game on the front of the e-cards 630 in addition to the reels 607 (e.g., the ranks and suits can fit in between reel elements, appear to float above or beneath the reel elements, be incorporated into the reel elements, etc.). Further, in some embodiments, the results of the secondary game may affect the primary game. For example, if the slot game wins, the player account associated with the e-cards 630 may receive increased betting limits on the primary game. The e-cards 630, in conjunction with a wagering game server, may provide awards for the secondary game that can assist the player account in the primary game, such as hints or tips, extra chips, or even upgraded cards (e.g., a slot win may result in a new card for the primary game, if desired). Additionally, the e-cards 630 can present random bonuses, secretly or publicly. The random bonuses can affect group play. For example, the system can randomly present a wild card value in place of a card value already electronically dealt to a player. When the wild card value replaces the already dealt card value, the system can present a sound that notifies other group members that the previously dealt card value was replaced by the wild card value.

Returning to FIG. 3, slot games are only one type of secondary content that the system can present. For example, the system can present community game information (e.g., the system can present progressive meters on the e-cards, the system can show a status of a long-term wagering game, etc). The system can present chat information, web content, account transactions, etc.

In some embodiments, the system can enable interactivity, game integration, interfacing, etc. between a primary wagering game and a secondary wagering game. For example, the system can scale secondary wagering game bet limits to primary wagering game bet limits, scale a number of playing elements for the secondary game to a number of electronic playing cards associated with the player account for the primary wagering game, modifying options for the primary wagering game based on results of the secondary wagering game, etc.

The flow 300 continues at processing block 310, where the system tracks changes in orientation of the electronic playing card and modifies images on the electronic playing card according to the changes in orientation. In some embodiments, the system can determine an orientation or position of e-cards and present card information based on the card orientation or position. For instance, the system can determine whether a playing side of an e-card is facing a player or player station, whether the playing side is against a playing surface, whether the playing side is turned too far from the player, etc. The system can also determine if a non-playing side of an e-card is facing upward, outward, etc. Thus, in some embodiments, the system can detect the positioning of the e-cards so that if they are accidently flipped over, or turned too far, the system can obscure, erase, turn off, or otherwise modify card values on the playing side of the e-card. In some embodiments, the system can present indicators on e-cards based on the e-cards' orientation. For example, the system can present flashes on an e-card to indicate a player's turn to bet, or play. However, if the system determines that the e-cards are lying against a flat surface, with the backs of the e-cards facing upward, the system can present flashes on only the back of the e-cards. If, however, the player is holding up the e-cards so that the e-cards are facing the player, then the system can present a flash on the front of the e-cards, as well as on the back, to notify both the player and opponents of the player's turn.

In some embodiments, the system can enable, or activate, security features based on the e-card's orientation. For instance, the system can determine a location, or position, of a player station associated with an e-card. The system can determine that a front card face is facing a first direction, following a first angle, within a range of pre-set, or pre-specified directions (e.g., safe angles of direction) at the player station. The range of pre-specified directions may be angles of direction for the front of an e-card to face and remain un-viewable from other player stations. The system can determine that the orientation of the front card face is turned away from the player station in a second direction, or angle, that is outside of the range of pre-specified directions or angles. In other words, the system determines that the front of the e-card is turned too far toward an opponent's location, or toward an opponent's player station, that the player's e-card values would inadvertently be revealed at a time, or in a specific state of play, where the card value should not be revealed (e.g., the player is still playing a hand of poker and is not at the point in the betting round where the player would intentionally reveal the front of the e-cards to opponents). If, therefore, the e-card is turned too far toward an opponent, the system can automatically modify the electronic images on the front card face to prevent the card value from being viewable from other player stations.

In some embodiments, the system can determine orientations of e-cards to present specific content to specific players. FIG. 7 illustrates an example of presenting advertising on e-cards based on player preferences and e-card orientation. In FIG. 7, a wagering game system ("system") 700 includes an electronic-playing-card table ("table") 710 with player stations 730 and 740. The system 700 can also include e-cards 731 and 741 positioned at two of the player stations (i.e., at player stations 730 and 740). The player station 740 is positioned opposite to the player station 730 such that a player at player station 730 has clear view of the back of the e-cards 741 when the player at player station 740 is holding up the e-cards 741. The system 700 can also include an e-card client 760 connected with a card tracking device 712 (e.g., a camera, a laser tracker, a global-positioning device, etc.) that can track the position and orientation of the e-cards 731 and 741. For example, the card tracking device 712 can determine a reference object incorporated with the electronic playing card, determine an initial orientation of the reference object, and determine a change in the initial orientation of the reference object. The system 400 can then modify electronic images on the e-cards 731 or 741 in response to the change in the initial orientation. The reference object can be viewable symbol on a face of the electronic playing cards 731, 741, a shape of the electronic playing cards 731, 741, a border of the electronic playing cards 731, 741, a gyroscopic tracking device attached to the electronic playing cards 731, 741, an electronic location tracking device attached to the electronic playing cards 731, 741, etc. In one embodiment, the card tracking device 712 can determine when the back of e-cards 741 are facing the player station 730. At the same time, the card tracking device 712 also determines that the front of the e-cards 741 are facing a player at the player station 740. The e-card client 760 can present an advertisement 742 (e.g., "Eat at Joe's") on the back of the e-cards 741 that would be of interest to a player account 780 associated with the player station 730. The e-card client 760 can also present advertisements on the front of the e-cards 741, which advertisements may be of interest to a player account at the player station 740. A wagering game server 750 can communicate with the e-card client 760 and provide card values that the e-card client 760 can present along with advertisements, or integrate with advertisements, and present on the front of a the e-cards 741 (e.g., integrate a face card character into the advertisement). Further, the card tracking device 712 can determine when the e-cards 741 are laying flat on the table. The e-card client 760 can then change the advertisement on the back of the e-cards 741 to be of interest to the player account at the player station 740. In some embodiments, the system 700 can also present accompanying advertisements on a player station display 706, such as a coupon that accompanies the advertisement presented on the back of the e-cards 741. The table 710 can include controls that can print out the coupon, or that can store the coupon (e.g. an electronic coupon code) with a player account 780. The system 700 can also include an account server 770 that stores the player account 780. The player account 780 can include e-card options 782, such as advertisement preferences 784 to present on e-cards, font sizes options 786 for images and text on e-cards, and game help options 788 for indicating helps on e-cards during a game (e.g., flashes on e-cards to indicate turns in a betting round, odds of winning for a given hand, betting limits for a round, player names, chip counts, etc.). Because the player account 780 has indicated a desire to view dining advertisements, the system 700 determines that the advertisement 742 on the back of the e-cards 741 should be related to dining (i.e., "Eat at Joe's" is an advertisement for a restaurant).

The flow 300 continues at processing block 312, where the system determines that presentation of content is completed and removes content from the electronic playing card. For example, the system can remove front images from the e-card front after a hand of poker. In another example, the system can determine that an e-card is removed from an electronic game table when it should not have been removed. As a security measure, the system can upload the current value of the e-card and erase all images from the e-card. The system can also determine when an e-card is repositioned, or returned, to an e-card device, such as to a player station's card control device, to a dealer's e-card shoe, to a "card-return" section of a playing-card table, etc. and erase, reprint, or replace the images for a subsequent wagering game or round of a wagering game.

Additional Example Operating Environments

This section describes example operating environments, systems and networks, and presents structural aspects of some embodiments.

Wagering Game Machine Architecture

Figure 8:
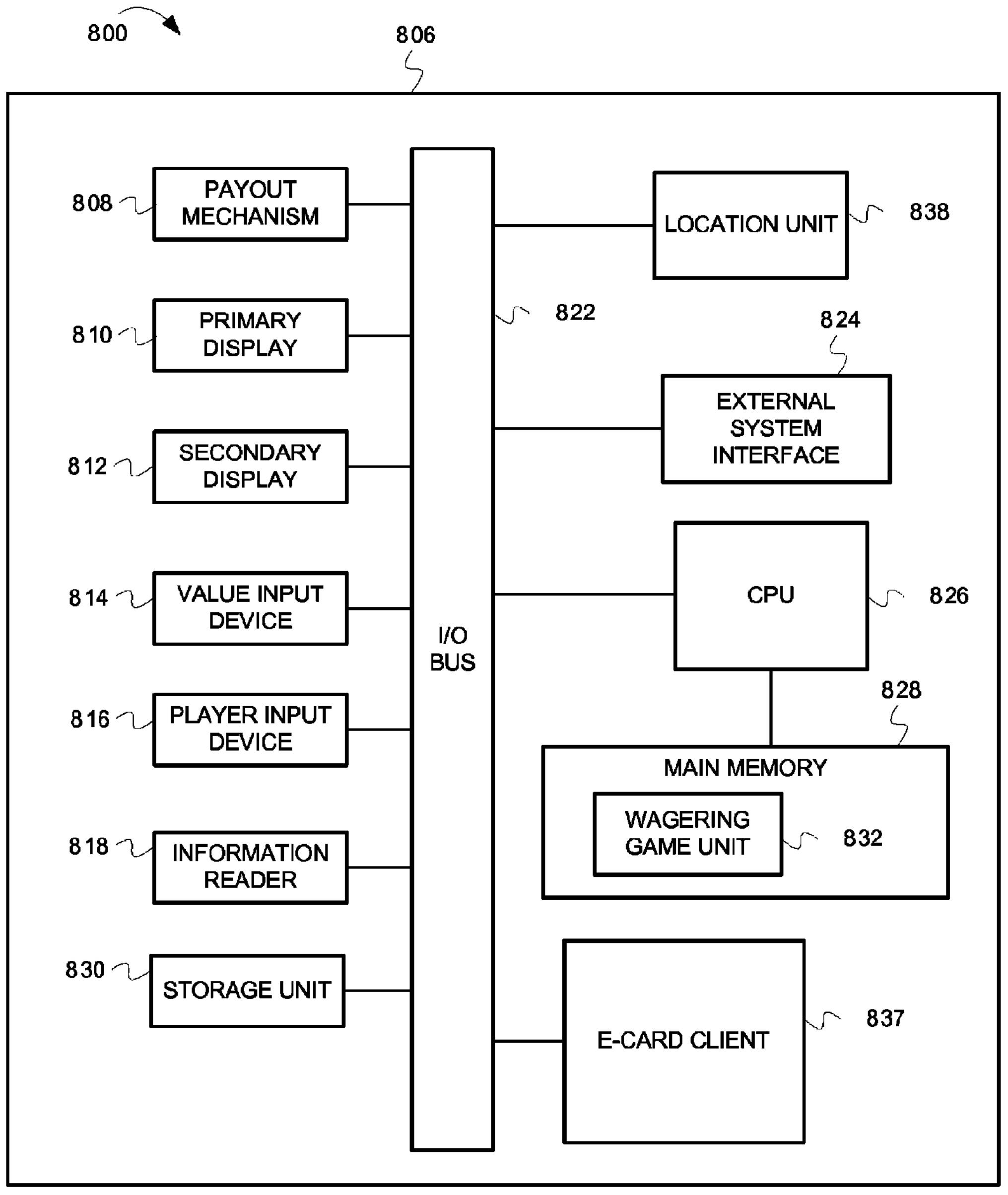
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes an e-card client 837. The e-card client 837 can process communications, commands, or other information, where the processing can control electronic playing cards in wagering game environments.

Furthermore, any component of the wagering game machine 806 can include hardware, firmware, and/or machine-readable storage media including instructions for performing the operations described herein.

Mobile Wagering Game Machine

Figure 9:
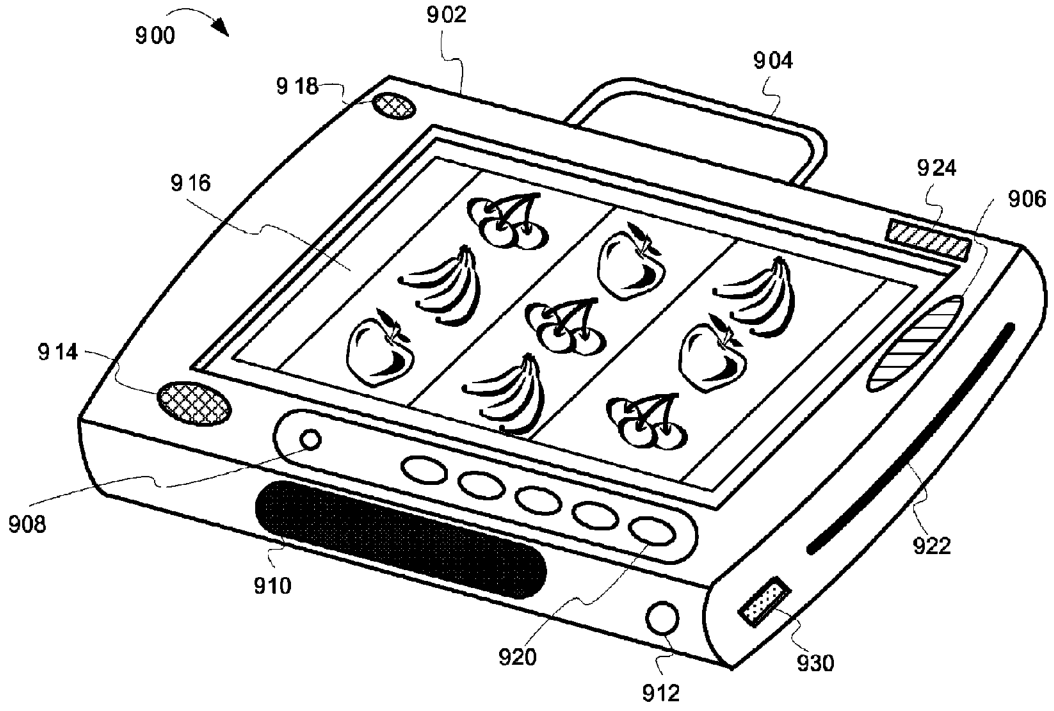
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In some embodiments, the housing has a form factor similar to a tablet PC, while other embodiments have different form factors. For example, the mobile wagering game machine 900 can exhibit smaller form factors, similar to those associated with personal digital assistants. In some embodiments, a handle 904 is attached to the housing 902. Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices (e.g., wireless communication units 912 and 924), microphone 918, and card reader 922. The card reader 922 can swipe electronic playing cards and modify images on the electronic playing card. Additionally, the mobile wagering game machine can include tilt, orientation, ambient light, or other environmental sensors.

In some embodiments, the mobile wagering game machine 900 uses the biometric device 906 for authenticating players, whereas it uses the display 916 and the speaker 914 for presenting wagering game results and other information (e.g., credits, progressive jackpots, etc.). The mobile wagering game machine 900 can also present audio through the audio jack 908 or through a wireless link such as Bluetooth.

In some embodiments, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In some embodiments, the mobile wagering game machine 900 is constructed from damage resistant materials, such as polymer plastics. Portions of the mobile wagering game machine 900 can be constructed from non-porous plastics that exhibit antimicrobial qualities. Also, the mobile wagering game machine 900 can be liquid resistant for easy cleaning and sanitization.

In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable storage media including instructions for performing the operations described herein.

The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, some embodiments may be embodied in a machine-readable signal medium including an electrical, optical, acoustical or other form of propagated signal (e.g., carrier waves, infrared signals, digital signals, etc.).

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

presenting primary content, for a wagering game, on an electronic playing card activated for use with the wagering game;

determining that a player account identification device is within a distance to the electronic playing card, wherein the player account identification device is associated with a player account;

detecting that a side of the electronic playing card is facing the player account identification device; and presenting secondary content on the side of the electronic playing card that is facing the player account identification device.

2. The computer-implemented method of claim 1, wherein the presenting the primary content comprises:

determining a card value for the electronic playing card for a playing round of the wagering game;

determining images that represent the card value; and presenting the images on the electronic playing card.

3. The computer-implemented method of claim 1, further comprising:

determining customized content for the player account; and presenting the customized content as the secondary content.

4. The computer-implemented method of claim 1, further comprising:

determining a location associated with the player account; and presenting the secondary content on a side of the electronic playing card that is viewable at the location associated with the player account.

5. The computer-implemented method of claim 4, further comprising:

determining secondary content preferences stored in the player account;

determining an advertisement related to the secondary content preferences; and presenting the advertisement on the electronic playing card.

6. The computer-implemented method of claim 1, wherein the electronic playing card is assigned to an additional player account different from the player account, and wherein the wagering game is associated with the additional player account.

7. The computer-implemented method of claim 6 further comprising presenting the primary content on an additional side of the electronic playing card facing a direction associated with the additional player account.

8. One or more non-transitory, machine-readable storage media having instructions stored thereon, which when executed by a set of one or more processors causes the set of one or more processors to perform operations comprising:

presenting primary wagering game content on a face of an electronic playing card, wherein the primary wagering game content is for a primary wagering game;

determining a request to present secondary content on the face of the electronic playing card, wherein the secondary content is not for the primary wagering game;

modifying presentation of the primary wagering game to accommodate presentation of the secondary content on the face of the electronic playing card; and presenting the secondary content on the face of the electronic playing card.

9. The one or more non-transitory, machine-readable storage media of claim 8, the operations further comprising:

determining a bet amount associated with a secondary wagering game associated with the secondary content;

transacting the bet via a player account associated with the secondary wagering game;

determining a result for the secondary wagering game from a wagering game server; and presenting the result on the face of the electronic playing card.

10. The one or more non-transitory, machine-readable storage media of claim 8, wherein said operation of modifying the presentation of the primary wagering game to accommodate the presentation of the secondary content on the face of the electronic playing card includes operations comprising:

storing an image of the primary wagering game content; and replacing the primary wagering game content on the electronic playing card with the secondary content.

11. The one or more non-transitory, machine-readable storage media of claim 8, wherein the secondary content comprises at least one slot reel image, and wherein the operation for presenting the secondary content on the face of the electronic playing card includes operations comprising:

presenting at least one slot reel image on the electronic playing card;

detecting a selection of a spin control; and animating the at least one slot reel image on the electronic playing card to represent at least one spinning slot reel.

12. The one or more non-transitory, machine-readable storage media of claim 8, the operations further comprising:

determining a player-selected configuration of the electronic playing card in relation to one or more additional electronic playing cards, presenting secondary wagering game content for a secondary wagering game on the electronic playing card and on the one or more additional electronic playing cards; and determining an outcome for the secondary wagering game based at least in part on the player-selected configuration of the electronic playing card in relation to the one or more additional electronic playing cards.

13. The one or more non-transitory, machine-readable storage media of claim 12, the operations further comprising:

determining a reconfiguration of the player-selected configuration after presenting the secondary wagering game content for the secondary wagering game; and modifying the outcome for the secondary wagering game based on the reconfiguration.

14. The one or more non-transitory, machine-readable storage media of claim 8, the operations further comprising:

integrating the primary wagering game with a secondary wagering game, wherein the secondary content is for the secondary wagering game; and modifying presentation of the primary wagering game content on the electronic playing card based on the interactivity between the primary wagering game and the secondary wagering game.

15. The one or more non-transitory, machine-readable storage media of claim 14, wherein the operation of integrating the primary wagering game and the secondary wagering game comprises one or more of scaling secondary wagering game bet limits to primary wagering game bet limits, scaling a number of playing elements for the secondary wagering game to a number of electronic playing cards associated with a player account of the primary wagering game, and modifying options for the primary wagering game based on results of the secondary wagering game.

16. The one or more machine-readable storage media of claim 8, wherein said operation of modifying the presentation of the primary wagering game to accommodate the presentation of the secondary wagering game content on the face of the electronic playing card includes operations comprising one or more of moving, minimizing, and removing the primary wagering game content from the face of the electronic card to present the secondary content.

17. A system comprising:

an electronic playing card client configured to present wagering game content on electronic playing cards for at least one wagering game, and present secondary content on the electronic playing cards along with the wagering game content; and an electronic game table configured to present a secondary content control on the electronic game table, determine a selection of the secondary content control via player input, and provide data to the electronic playing card client, based on the selection of the secondary content control, wherein the electronic playing card client is configured to use the data to coordinate presentation of the wagering game content and the secondary content on the electronic playing cards.

18. The system of claim 17, further comprising a projection device configured to project images onto surfaces of the electronic playing cards.

19. An apparatus comprising:

one or more processors; and an electronic playing card orientation tracker configured to, via the one or more processors, present an electronic image for a wagering game on a face of an electronic playing card, wherein the wagering game is in a state of play where the electronic image should not be revealed, detect a change in an orientation of the electronic playing card that would cause the electronic image to be revealed, and modify the electronic image on the electronic playing card to prevent the electronic image from being revealed according to the change in the orientation of the electronic playing card.

20. The apparatus of claim 19, wherein the electronic playing card orientation tracker is configured to detect a change to an orientation of a reference object of the electronic playing card, and wherein the reference object is one or more of a viewable symbol on the electronic playing card, a shape of the electronic playing card, a border of the electronic playing card, a gyroscopic tracking device incorporated with the electronic playing card, and an electronic location tracking device incorporated with the electronic playing card.

21. The apparatus of claim 19, wherein the electronic playing card orientation tracker is configured to determine that the face of the electronic playing card is facing a first direction within a range of angles at a player station associated with the electronic playing card, wherein the range of angles specify possible orientations for the face of the electronic playing card to face and remain un-viewable from one or more additional player stations, determine that the face of the electronic playing card is oriented to an angle that is outside of the range of angles, and modify the electronic image on the face of the electronic card to prevent the electronic image from being viewable from the one or more additional player stations.

22. An apparatus comprising:

means for presenting wagering game content on an electronic playing card for a secondary wagering game;

means for detecting a player-selected configuration of the electronic playing card relative to one or more additional electronic playing cards; and means for determining an outcome for the secondary wagering game based on the player-selected configuration of the electronic playing card in relation to the one or more additional electronic playing cards.

23. The apparatus of claim 22 further comprising:

means for determining a reconfiguration of the player-selected configuration after presenting the wagering game content for the secondary wagering game; and means for modifying the outcome for the secondary wagering game based on the reconfiguration.

24. The apparatus of claim 22, further comprising presenting the wagering game content for the secondary wagering game concurrently with presenting the wagering game content for a primary wagering game on the electronic playing card, wherein the secondary wagering game is separate from the primary wagering game.

* * * * *